(12) United States Patent
Vadhri et al.

(10) Patent No.: US 11,940,993 B2
(45) Date of Patent: Mar. 26, 2024

(54) PUSH INTERACTION INCLUDING LINKED DATA

(71) Applicant: Visa International Service Association, San Francisco, CA (US)

(72) Inventors: Srinivas Vadhri, San Ramon, CA (US); Wenhai Pan, San Mateo, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 45 days.

(21) Appl. No.: 17/389,969

(22) Filed: Jul. 30, 2021

(65) Prior Publication Data

US 2023/0031249 A1 Feb. 2, 2023

(51) Int. Cl.
*G06F 16/23* (2019.01)
*G06F 16/955* (2019.01)

(52) U.S. Cl.
CPC ...... *G06F 16/2379* (2019.01); *G06F 16/9558* (2019.01)

(58) Field of Classification Search
None
See application file for complete search history.

(56) References Cited

U.S. PATENT DOCUMENTS

| | | | |
|---|---|---|---|
| 8,290,865 B2 | 10/2012 | Lawrence et al. | |
| 9,898,719 B2 * | 2/2018 | Godsey | G06Q 20/353 |
| 10,489,756 B2 | 11/2019 | Britt | |
| 10,686,781 B1 * | 6/2020 | Kaditz | H04L 67/10 |
| 2012/0066124 A1 | 3/2012 | Modi | |
| 2012/0089509 A1 * | 4/2012 | Kasriel | G06Q 40/00 705/40 |

(Continued)

FOREIGN PATENT DOCUMENTS

| | | |
|---|---|---|
| EP | 1465128 A1 | 10/2001 |
| EP | 2374102 A4 | 10/2011 |

OTHER PUBLICATIONS

Johnson, Dave "How to use the Venmo mobile app to make or receive payments," Dec. 3, 2020, www.businessinsider.com/guides/tech/how-to-use-venmo (Year: 2020).*

*Primary Examiner* — Richard L Bowen
(74) *Attorney, Agent, or Firm* — Kilpatrick Townsend & Stockton LLP (57) ABSTRACT

A method is disclosed. The method includes receiving, by a second entity computer associated with a second user from a first entity computer associated with a first user, a push transaction message comprising a value and link data for a transaction. The method also comprises transmitting, by the second entity computer to a directory computer in communication with a database storing supplemental data associated with the transaction and other transactions, a request for the supplemental data associated with the transaction, the request comprising link data. The method also includes receiving, by the second entity computer, the supplemental data from the directory computer, and providing, by the second entity computer to the second user via a second user device, the supplemental data along with a notification of an action caused by the push transaction message.

13 Claims, 5 Drawing Sheets

(56) References Cited

U.S. PATENT DOCUMENTS

| | | | |
|---|---|---|---|
| 2015/0310430 A1* | 10/2015 | Goldstone | G06Q 20/32 |
| | | | 705/44 |
| 2015/0363761 A1* | 12/2015 | Grigg | G06Q 20/102 |
| | | | 705/40 |
| 2017/0004468 A1* | 1/2017 | Stroeh | G06Q 20/29 |
| 2017/0270494 A1* | 9/2017 | Nayak | H04W 4/12 |
| 2020/0186355 A1* | 6/2020 | Davies | H04L 9/3221 |
| 2021/0065178 A1* | 3/2021 | Rudden | G06Q 20/363 |
| 2022/0255907 A1* | 8/2022 | Agarwal | H04L 9/12 |
| 2022/0318866 A1* | 10/2022 | Orlinsky | G06Q 20/20 |

\* cited by examiner

PUSH INTERACTION INCLUDING LINKED DATA

CROSS-REFERENCE TO RELATED APPLICATIONS

None.

BACKGROUND

Push transactions are known. In a push transaction, value is pushed to a recipient. Unlike a pull transaction, which is initiated by a recipient of the transfer, in a push transaction, the recipient of the value transfer may not know what the pushed value pertains to. For instance, a recipient may send an invoice for a certain amount to a sender. The sender of value may could initiate two or more push transactions for different amounts to the recipient to satisfy the invoice. Or, the sender could mistakenly initiate a push transaction for an amount that is different than the amount on the invoice. In both of these examples, the recipient of the push transactions may not know that those push transactions are for the invoice that was sent from the recipient to the sender. As a result, the ability of a recipient to reconcile the invoice to the push payments is very difficult, and extra time and/or computing resources are required to reconcile the push payments to the proper invoice.

One solution might be to include a copy of the invoice in the push transfer message. In some cases, however, the push transaction message conforms to an existing standard such as ISO 8583. Such push transaction messages are very structured, and it is very difficult to substantially modify the formats of such messages, since doing so would require many computer network modifications. As such, existing push transaction message cannot be substantially modified to include large files. Thus, improved push transaction system and methods are needed.

Embodiments of the invention address these and other problems, individually and collectively.

BRIEF SUMMARY

One embodiment of the invention includes a method comprising: receiving, by a second entity computer associated with a second user from a first entity computer associated with a first user, a push transaction message comprising a value and link data for a transaction; transmitting, by the second entity computer to a directory computer in communication with a database storing supplemental data associated with the transaction and other transactions, a request for the supplemental data associated with the transaction, the request comprising link data; receiving, by the second entity computer, the supplemental data from the directory computer; and providing, by the second entity computer to the second user via a second user device, the supplemental data and a notification of an action caused by the push transaction message.

Another embodiment includes a second entity computer comprising: a data processor; and a non-transitory computer readable medium, the non-transitory computer readable medium comprising code, executable by the data processor to cause the second entity computer to perform operations including: receiving, by the second entity computer associated with a second user from a first entity computer associated with a first user, a push transaction message comprising a value and link data for a transaction; transmitting, by the second entity computer to a directory computer in communication with a database storing supplemental data associated with the transaction and other transactions, a request for the supplemental data associated with the transaction, the request comprising link data; receiving, by the second entity computer, the supplemental data from the directory computer; and providing, by the second entity computer to the second user via a second user device, the supplemental data and a notification of an action caused by the push transaction message.

Another embodiment includes a method comprising: receiving, by a directory computer from a second entity computer, a request for the supplemental data associated with a push transaction, the request comprising link data; sending, by the directory computer, a request for the supplemental data to a database using the link data; receiving, by the directory computer, the supplemental data from the database; and transmitting, by the directory computer to the second entity computer, the supplemental data.

Another embodiment includes a directory computer comprising a processor, and a non-transitory computer readable medium coupled to the processor, the non-transitory computer readable medium comprising code, executable by the processor to cause the directory computer to perform operations including: receiving, by a directory computer from a second entity computer, a request for the supplemental data associated with a push transaction, the request comprising link data; sending, by the directory computer, a request for the supplemental data to a database using the link data; receiving, by the directory computer, the supplemental data from the database; and transmitting, by the directory computer to the second entity computer, the supplemental data.

These and other embodiments are described in further detail below.

DETAILED DESCRIPTION

Prior to discussing embodiments of the disclosure, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be any suitable device that a user can interact with (e.g., a payment card or mobile phone). User devices may be in any suitable form. Some examples of user devices include cards (e.g., payment cards such as credit, debit, or prepaid cards) with magnetic stripes or contactless elements (e.g., including contactless chips and antennas), cellular phones, PDAs, personal computers (PCs), tablet computers, and the like. In some embodiments, where a user device is a mobile device, the mobile device may include a display, a memory, a processor, a computer-readable medium, and any other suitable component.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g., 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g., cellular phones), PDAs, tablet computers, net books, laptop computers, wearable devices (e.g., watches), vehicles such as automobiles and motorcycles, personal music players, handheld specialized readers, etc. A mobile device may comprise any suitable hardware and software for performing such functions, and may also include multiple devices or components (e.g., when a device has remote access to a network by tethering to another device—i.e. using the other device as a modem—both devices taken together may be considered a single mobile device).

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

A "merchant" may typically be an entity that engages in transactions and can sell goods or services, or provide access to goods or services. In some embodiments, a merchant may be a seller which lists a good and/or service on a website hosted by the aggregation entity.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), username, expiration date, and verification values such as CVV, dCVV, CVV2, dCVV2, and CVC3 values.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card. A digital wallet may be a transfer application.

A "token" may be a substitute value for other data such as a credential or supplemental data. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization enhances transaction efficiency and security.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

"Supplemental data" may include any data that is supplemental to a transaction. Such information is not necessary to perform the transaction. Examples of supplemental data may include remittance data, invoice data, sender data, transaction data, etc. The supplemental data can be in any suitable format including data files in including word processing program files, text files, PDF documents, HTML files, etc. The supplemental data may be structured or unstructured data. Specific information that can be included in supplemental data may include a sender's name, a tax number, the purpose of the value transfer, an invoice ID, a recipient name, a tax number, an entity computer ID, etc. Supplemental data may also include one or more dates, a second entity identifier, and/or a second entity category code.

An "entity computer" may be a computer operated by a particular entity. The particular entity may be a financial institution such as a sender bank or a recipient bank. The financial institution may be an authorizing entity such as an issuer or a merchant bank such as an acquirer.

"Link data" may include data that can be used to link a push transaction message to other supplemental data. In some embodiments, the link data can be a link token which may be an identifier comprising any suitable number or type of characters. Example link tokens can include GUIDs (global unique identifiers), transaction IDs, random identifiers, etc. In other embodiments, the link data may be a hyperlink that can directly link a push transaction message to a location in a database that contains the supplemental data.

Figure 1:
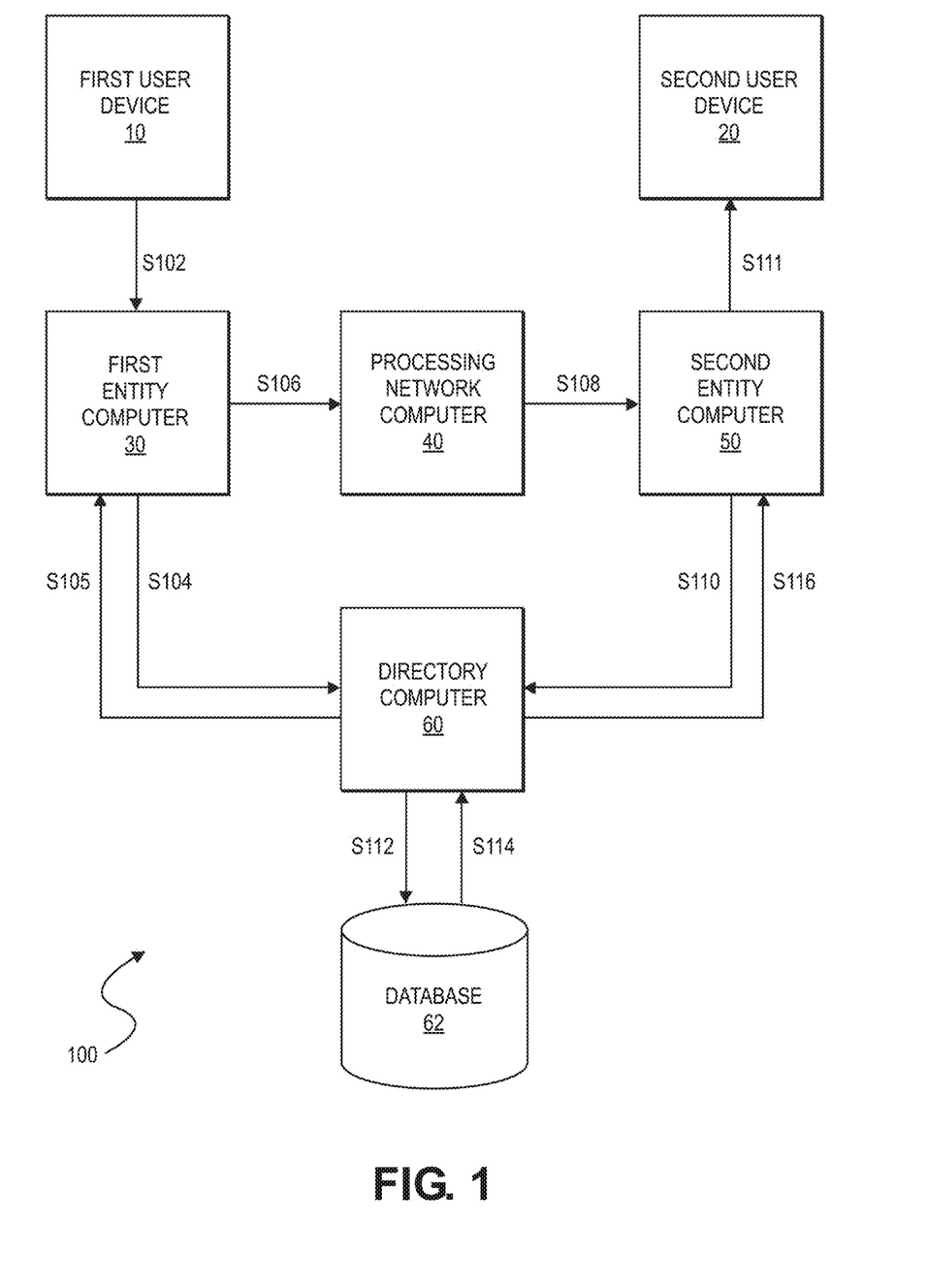
FIG. 1 shows a system diagram with a process flow according to an embodiment.

FIG. 1 shows a system diagram, and a process flow according to an embodiment. The system includes a first user device 10 that communicates with a first entity computer 30. The first user device 10 could be operated by a first user (e.g., a sender of funds) that has an account with a first organization (e.g., a sending financial institution such as a sending bank) that operates the first entity computer 30. An example of a first entity computer can be an authorizing entity computer or a transport computer.

The first entity computer 30 can communicate with a second entity computer 50 via a processing computer 40. The second entity computer 50 may be operated by a second organization (e.g., a receiving financial institution or a receiving bank). An example of a second entity computer may be an authorizing entity computer or a transport computer. The processing computer 40 may a computer in a payment processing network.

The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

The second entity computer 50 may communicate with a second user device 20 operated by a second user (e.g., a recipient of funds). The first entity computer 30 and the second entity computer 50 can communicate asynchronously with a directory computer 60. The directory computer 60 can communicate with a database 62, which stores supplemental data such as remittance data.

Messages between the devices in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network that may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

Methods according to some embodiments can be described with respect to FIG. 1.

In step S102, the first user device 10 may transmit a transaction initiation message to the first entity computer 30 to generate a push transaction message. In some embodiments, the transaction initiation message may take place via a digital wallet in the first user device 10. The push transaction message can cause funds to be pushed from an account associated with the first user maintained at the first entity computer 30 to an account associated with a second user maintained at the second entity computer 50. In some embodiments, the first user could be a consumer and the second user could be a merchant. In other embodiments, such as in a person to person payment context, the first user could be a person and the second user could be another person.

Prior to transmitting the instruction, the first user 10 may have received some instruction to provide a payment or transfer of value to a second user operating the second user device 20. In some embodiments, the instruction to provide the payment or the transfer of value may be in the form of an invoice or other supplemental data. The invoice may have been for services rendered to the first user by the second user. The invoice may include an invoice number, and details regarding the services performed. The instruction to provide a payment or transfer of value to the second user that is transmitted from the first user device 10 to the first entity computer 30 can include an account identifier (e.g., a credential or payment token) for an account of the first user maintained by the first entity computer 30, a transaction amount, and the supplemental data such as the invoice, which causes the first user to pay the second user. The account of the first user can be identified by the account identifier (e.g., payment credential such as a PAN or a payment token). The instruction to provide the payment or transfer of value may also include an account identifier (e.g., a credential or payment token), or alias thereof, for an account of the second user maintained by the second entity computer 50.

In some embodiments, the supplemental data such as an invoice could be sent separately from payment details that are used to generate the push transaction message. The supplemental data could be provided by the first user computer 10 to the first entity computer 30 via a document scan, a batch file upload, etc.

In step S104, the first entity computer 30 may transmit the supplemental data such as a copy of the invoice to the directory computer 60, which may in turn store the supplemental data in the database 62. In some embodiments, supplemental data received in different data formats is converted to a single common format, such that the supplemental data can be easily viewable by any user devices or entity computers. In some embodiments, the data in the database 62 are encrypted when the data are at rest and are decrypted when the supplemental data is provided to legitimate users.

After receiving the supplemental data from the first entity computer 30, the directory computer 60 may in turn generate link data which is sent back to the first entity computer 30 in step S105. In some embodiments, the link data may be in the form of a link token (e.g., an identifier for the invoice)

or a hyperlink which re-directs a computer to the supplemental data which may be stored in a remote database.

In step S106, the first entity computer 30 generates a push transaction message and then transmits it to the processing computer 40. The push transaction message may be modified to include link data, which is data that can be used to link the push transaction message to the supplemental data. The linked data can be used by a recipient of the push transaction message to retrieve the supplemental data.

The push transaction message may be in an ISO 8583 format. In some embodiments, the push transaction message can include at least the account identifier (e.g., an account number such as a primary account number of PAN or a payment token) of the second user, the amount of the transaction, an indicator that indicates that the current transaction is a push transaction, and the link data. Note that in some embodiments the link data may only be several bytes (e.g., 10-100 bytes) whereas the supplemental data could be several kilobytes or even megabytes of data. The link data could be included in a supplemental data field in a push transaction message such as a discretionary data field. Alternatively, one or more data fields (e.g., a name data field) could be repurposed to include the link data.

In some embodiments, the account identifier of the second user used to receive funds is a credit, debit or prepaid card account number, and the account identifier used by the first user to provide funds is also a credit, debit or prepaid card account. In such embodiments, the push transaction message can be considered part of a card-to-card payment transfer process.

In some embodiments, the push transaction message may be an OCT (Original Credit Transaction) message. An OCT (Original Credit Transaction) can be a clearing and settlement credit transaction designed for use in business applications such as a business money transfer or business-to-consumer repayments. The OCT can be a transaction used to deliver funds to the recipient account. It is separate from, and can take place after, an AFT (account funding transaction) transaction in some cases. An AFT can be a transaction designed to supply funds to another account such as a credit, prepaid, debit, ATM or on-line account. This timing is to ensure that payment funds are secured before funds are sent to the recipient.

The amount of the OCT can be the amount agreed to by the sender and the service provider in the currency agreed. The OCT can carry the account number of the recipient and no information about the sender. A special indicator can identify an OCT to the recipient's issuer bank. Settlement can take place within two days, or more or less time than this.

At step S108, after receiving the push transaction message, the processing computer 40 can analyze the push transaction message, determine the appropriate entity to route the push transaction message, and transmit the push transaction message to that entity. In some embodiments, the processing computer 40 can analyze the account identifier to determine the address of second entity computer 50. For example, if the account identifier is a PAN or primary account number, the BIN or bank identifier number of the PAN would identify the entity operating the second entity computer 50. Also, in some embodiments, fraud or security checks may be performed on the data in the push transaction message to ensure that it is not fraudulent. If it is determined to be fraudulent, the transaction can be rejected or a fraud score indicating this can be included in the push transaction message that is sent to the second entity computer 50.

The second entity computer 50 can then receive the push transaction message comprising the transaction amount and the link data for the transaction from the processing computer 40. After receiving the push transaction message, second entity computer 50 can analyze the push transaction message. The second entity computer 50 can then credit the account associated with the account identifier for the transaction amount, or an amount derived from the transaction amount (e.g., in case fees are subtracted from the amount received).

In step S111, in response to the crediting of the second user's account, the second entity computer can generate and transmit a notification to the second user device 20 to notify the second user that the credit has occurred.

At a later time, after the crediting of the account, a clearing and settlement process can take place between the processing computer 40, the first entity computer 30, and the second entity computer 50. The clearing and settlement process can facilitate the transfer of actual funds from the account of the first user to the second user's account or another account maintained by the second entity computer.

Before, during or after the crediting of the second user's account, the second entity computer 50 may obtain the supplemental data associated with the push transaction message. In some embodiments, as shown in step S110, this may include transmitting, by the second entity computer 50 to the directory computer 60 in communication with the database 62, a request for the supplemental data associated with the transaction. The database 62 may store supplemental data associated with the transaction and other transactions. The supplemental data request comprises link data. The communication between the second entity computer 50 and the directory computer 60 may be via an API.

In steps S112, S114, after receiving the supplemental data request, the directory server computer 60 may retrieve the supplemental data from the database 62 using the link data. In some embodiments, the link data may in the form of a link token, which can be an identifier for the supplemental data. For example, the identifier could be an invoice number if the supplemental data is in the form of an invoice. In other embodiments, the link may be a hyperlink, which has an address which corresponds to the location of the supplemental data in the database 62.

After the directory computer 60 obtains the supplemental data from the database 62, in step S116, the second entity computer 50 receives the supplemental data from the directory computer 60. The second entity computer 50 can transmit the supplemental data to the second user device 20. In some embodiments, the supplemental data can be transmitted to the second user device 50 in step S111 when the second user is notified that the credit occurred. In other embodiments, the supplemental data can be transmitted to the second user device 50 in a communication that is separate from the transmission in step S111. In such embodiments, the supplemental data could either be pushed to the second user device 20 or it could be only sent when the second user device 20 requests it.

Figure 2:
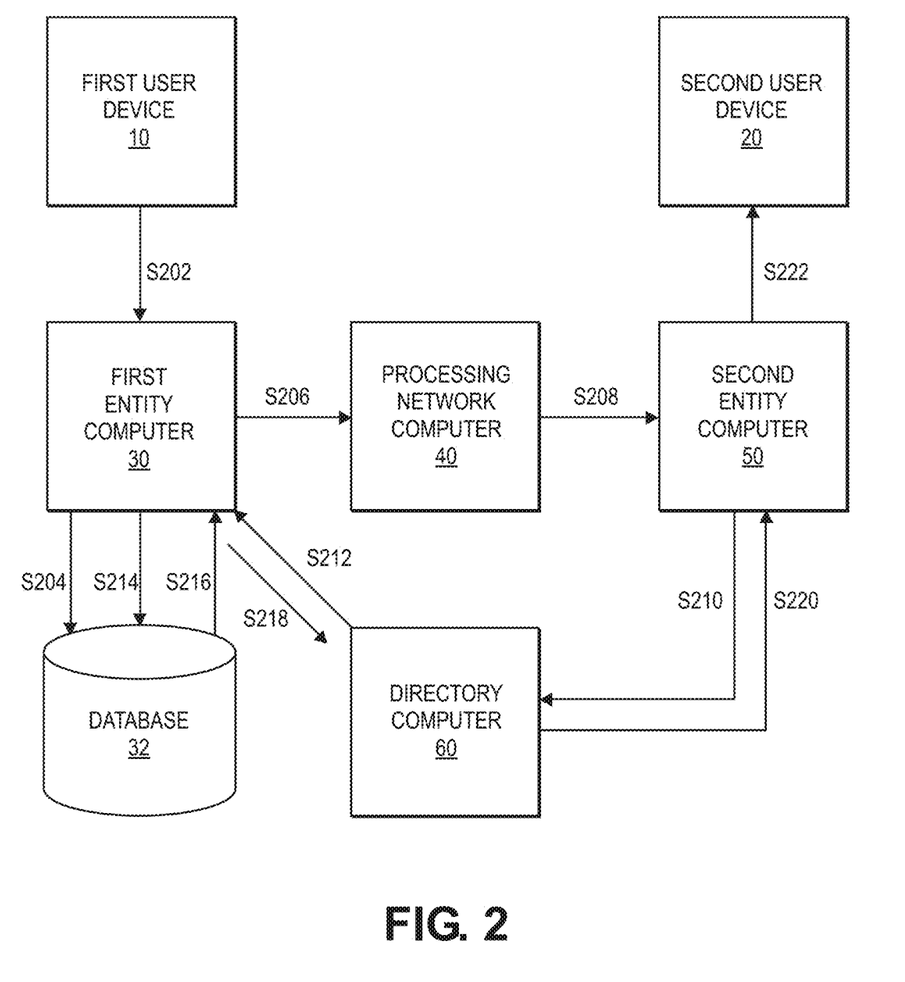
FIG. 2 shows a system diagram with a process flow according to another embodiment.

FIG. 2 shows a system diagram with a method according to another embodiment. In FIGS. 1 and 2, like elements can have similar reference numbers. In the method illustrated in FIG. 2, the database which holds the supplemental data is present in a database 32 that is accessible to the first entity computer 30. The directory computer 60 communicates with the first entity computer 30 to retrieve the supplemental data instead of retrieving it from its own database.

In step S202, the first user device 10 may transmit a transaction initiation message to the first entity computer 30 to generate a push transaction message as described above with respect to step S102 in FIG. 1.

In step S204, the first entity computer 30 may transmit the supplemental data such as a copy of the invoice to its own database 32, which may in turn store the supplemental data. The supplemental may be stored with in conjunction with link data that is generated by the first entity computer 30, or such link data may have been generated by the directory computer 60 on behalf of the first entity computer 30.

In step S206, the first entity computer 30 generates a push transaction message and then transmits it to the processing computer 40. The push transaction message may be modified to include the link data, which is data that can be used to link the push transaction message to the supplemental data. In this example, the link data may comprise a set of data including an identifier for the first entity computer 30, as well as a link token or a hyperlink that points to the supplemental data in the database 32. The supplemental data can be used by the recipient of the push transaction message to retrieve the supplemental data. As in the embodiment described with respect to FIG. 1, the push transaction message may be an OCT message.

As in the embodiment described above with respect to FIG. 1, in some embodiments, the push transaction message can include at least the account identifier (e.g., an account number such as a primary account number of PAN) of the second user, the amount of the transaction, an indicator that indicates that the current transaction is a push transaction, and the link data.

At step S208, the processing computer 40 can analyze the push transaction message, determine the appropriate entity to route the push transaction message, and then provide the push transaction message to that entity. In some embodiments, the processing computer 40 can analyze the account identifier to determine the address of second entity computer 50. For example, if the account identifier is a PAN or primary account number, the BIN or bank identifier number of the PAN would identify the entity operating the second entity computer 50.

The second entity computer 50 can then receive the push transaction message comprising the transaction amount and the link data for the transaction. After receiving the push transaction message, second entity computer 50 can analyze the push transaction message and can credit the account associated with the account identifier for the transaction amount, or an amount derived from the transaction amount (e.g., in case fees are subtracted from the amount received).

In step S222, in response to the crediting of the second user's account, the second entity computer can generate and transmit a notification to the second user device 20 to notify the second user that an action such as the credit has occurred.

At a later time, after the crediting of the account, a clearing and settlement process can take place between the processing computer 40, the first entity computer 30, and the second entity computer 50. The clearing and settlement process can facilitate the transfer of actual funds from the account of the first user to the second user's account or another account maintained by the second entity computer.

Before, during or after the crediting of the second user's account, the second entity computer 50 may obtain the supplemental data associated with the push transaction message. In some embodiments, as shown in step S210, this may include transmitting, by the second entity computer 50 to the directory computer 60, a request for the supplemental data. The supplemental data request comprises link data such as a link token or a hyperlink, as well as an identifier of the first entity computer.

After receiving the supplemental data request, the directory computer 60 can determine the appropriate first entity computer 30 associated with the push transaction message using the identifier for the first entity computer 30. After determining the appropriate first entity computer 30 associated with the push transaction message, in steps S212, the directory computer 60 can transmit a supplemental data request message to the first entity computer 30. The first entity computer 30 may retrieve the supplemental data from the database 32 in steps S214 and S216. Alternatively, the directory computer can retrieve the supplemental data directly from the database 32 without contacting the first entity computer 30. In some embodiments, the communication between the first entity computer 50, and the directory computer 60 and/or the database 32 may via an API.

In step S218, the first entity computer 30 transmits the supplemental data to the directory server computer 60 and the directory server computer 60 receives the supplemental data.

In step S220, the directory computer 60 then transmits the supplemental data to the second entity computer 50. The second entity computer 50 can transmit the supplemental data to the second user device 20. In some embodiments, the supplemental data can be transmitted to the second user device 50 in step S222 when the second user is notified that the credit occurred. In other embodiments, the supplemental data can be transmitted to the second user device 50 in a communication that is separate from the transmission in step S222.

Figure 3:
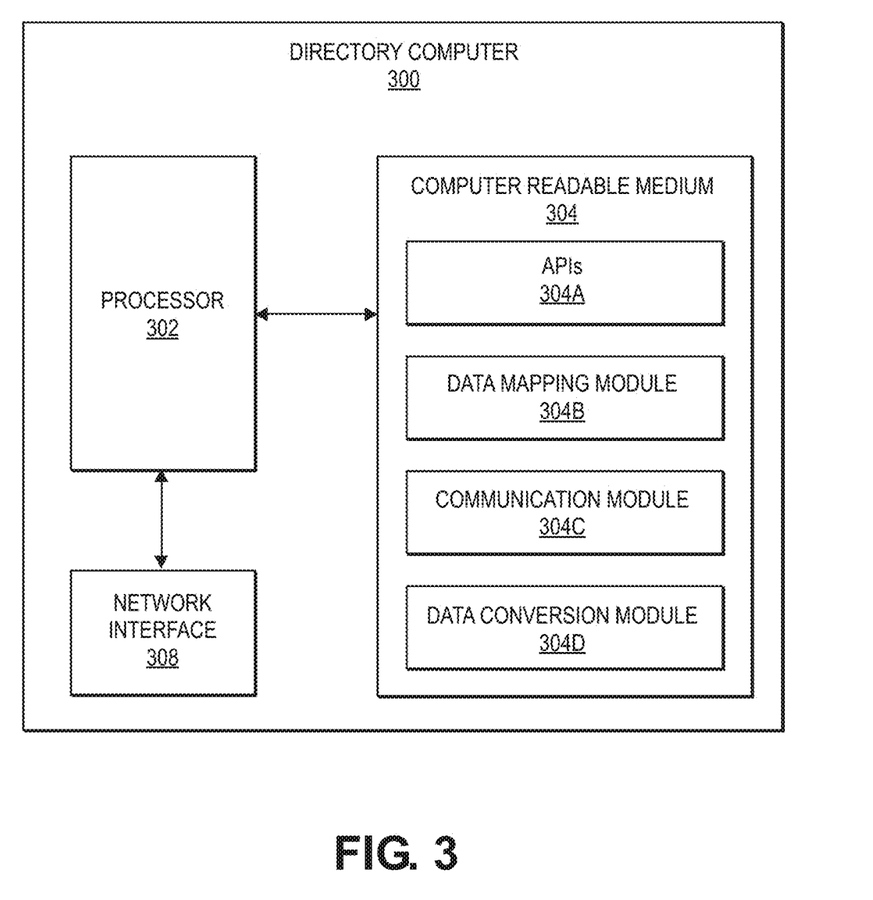
FIG. 3 shows a block diagram of a directory computer according to an embodiment.

FIG. 3 shows a block diagram of a directory computer according to an embodiment. The directory computer 300 comprises a processor 302. A network interview 308 and a non-transitory computer readable medium 504 may be coupled to the processor 302.

The processor 302 may be implemented as one or more integrated circuits (e.g., one or more single core or multicore microprocessors and/or microcontrollers). The processor 302 may be used to control the operation of the first user device 110. The processor 302 can execute a variety of programs in response to program code or computer-readable code stored in a computer readable medium 304. The processor 112 may include functionality to maintain multiple concurrently executing programs or processes.

The network interface 308 may be configured to connect to one or more communication networks to allow the directory computer 300 to communicate with other entities. Communication with the directory computer 300 can be direct, indirect, and/or via an API.

The network interface 308 may include an interface that can allow the directory computer 300 to communicate with external computers. The network interface 308 may enable the directory computer 300 to communicate data to and from another device. Some examples of the network interface 308 may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface 308 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 308 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Computer-readable medium 304 may comprise one or more non-transitory media for storage and/or transmission. Suitable media include, as examples, a random access memory (RAM), a read only memory (ROM), a magnetic medium such as a hard-drive, or an optical medium such as a CD (compact disk) or DVD (digital versatile disk), flash memory, and the like. The computer-readable medium 304 may be any combination of such storage or transmission devices. The computer readable medium 504 may be embodied by any number of non-volatile memories (e.g., flash memory) and volatile memories (e.g., DRAM, SRAM), or any other non-transitory storage medium, or a combination of media.

The computer readable medium 304 may comprise one or more APIs 304A, and software modules. Examples of software modules may include a data mapping module 304B and a communication module 304C. The computer readable medium 304 may also comprise code, executable by the processor 302, to implement a method comprising: receiving, by a directory computer from a second entity computer, a request for the supplemental data associated with a push transaction, the request comprising link data; sending, by the directory computer, a request for the supplemental data to a database using the link data; receiving, by the directory computer, the supplemental data from the database; and transmitting, by the directory computer to the second entity computer, the supplemental data In some embodiments, the data mapping module 304B may comprise code, executable by the processor 302 for linking link data and supplemental data associated with a push transfer message. The data mapping module 304B may include a table that correlates link data to locations of supplemental data in a database.

In some embodiments, the communication module 304C may comprise code executable by the processor 302 for allowing the directory computer 300 to communication with other external computers. The communication module 304C may comprise code, executable by the processor 302 for formatting messages for delivery to external computers and for receipt of messages from external computers.

The data conversion module 304D could convert supplemental data in a common data format so that it can be easily viewable by end users, regardless of the format of the originally submitted supplemental data. For example, the originally submitted supplemental data may include data in CSV, PDF, and Word files, but may be converted to an HTML data format for ease of viewing or data retrieval by various end users.

Figure 4:
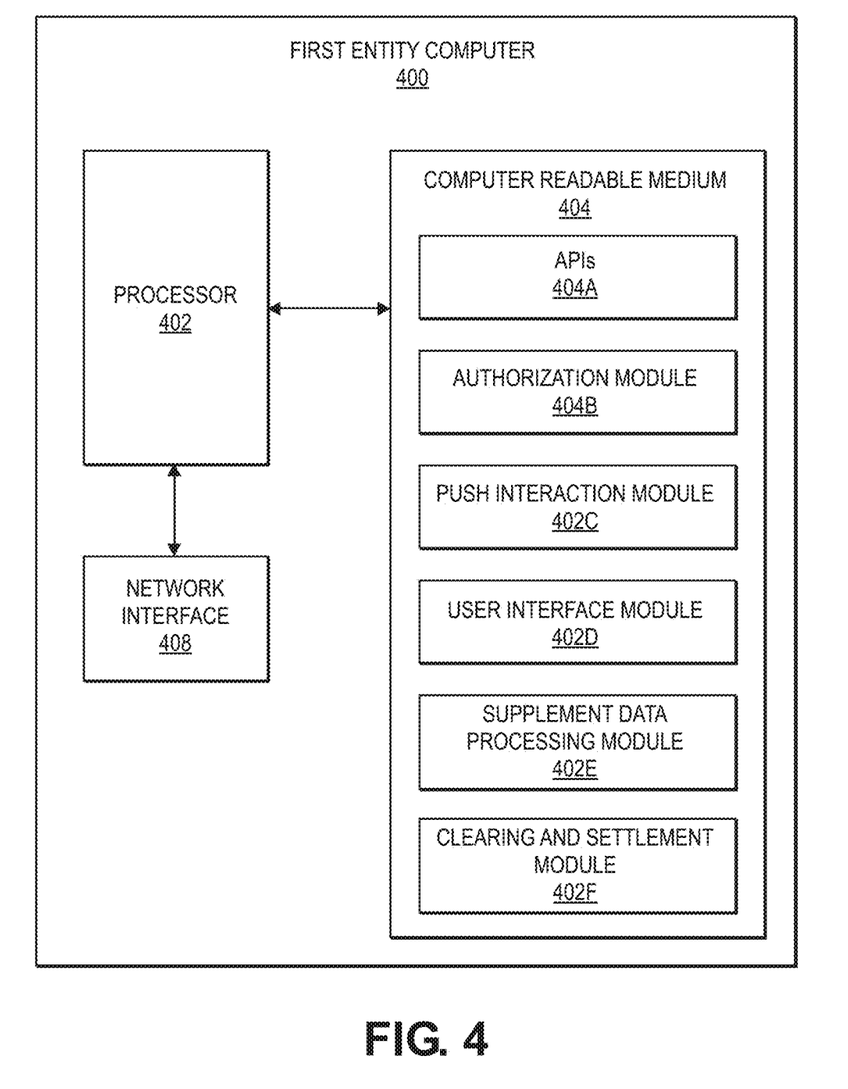
FIG. 4 shows a block diagram of a first entity computer according to an embodiment.

FIG. 4 shows a block diagram of a first entity computer 400 according to an embodiment. The first entity computer 400 can comprise a processor 402, a computer readable medium 404, and a network interface 408. Aspects of the processor 402 and the network interface 408 are similar to those described above with respect to FIG. 3, and the descriptions thereof need not be repeated herein.

The computer readable medium 404 comprises one or more APIs 404A, an authorization module 404B, a push interaction module 404B, a user interface module 402E, and a clearing and settlement module 402F.

The authorization module 404B may comprise code executable by the processor 402 for causing the first entity computer 400 to authorize transactions. The authorization module 404B and the processor 402 can analyze an authorization request message and check a corresponding account to determine if the account has sufficient funds or credit to authorize a transaction. They may also analyze data in an authorization request message to determine if the transaction is potentially fraudulent.

The push interaction module 402C and the processor 402 can generate and transmit push transaction messages. As noted above, the push transaction messages may include data fields that can be populated with certain data including a transaction amount, link data, a recipient account identifier, etc.

The user interface module 402D and the processor 402 can provide a user interface to any client computer including the first user device 10. The user interface module 402D could provide a user with a way to access data stored in the directory computer that is in communication with the first entity computer 400.

The supplemental data processing module 402E and the processor 402 can process supplemental data as described herein. The supplemental data processing module 402E can (with the processor 402) convert original supplemental data in different formats into a common format, may store the supplemental data, and/or may format the supplemental data for delivery to an intended recipient.

The clearing and settlement module 402F and the processor 402 can perform a clearing and settlement process with various entities including a processing computer in a payment processing network. It may process clearing messages and may facilitate the transfer of funds between different entities.

Figure 5:
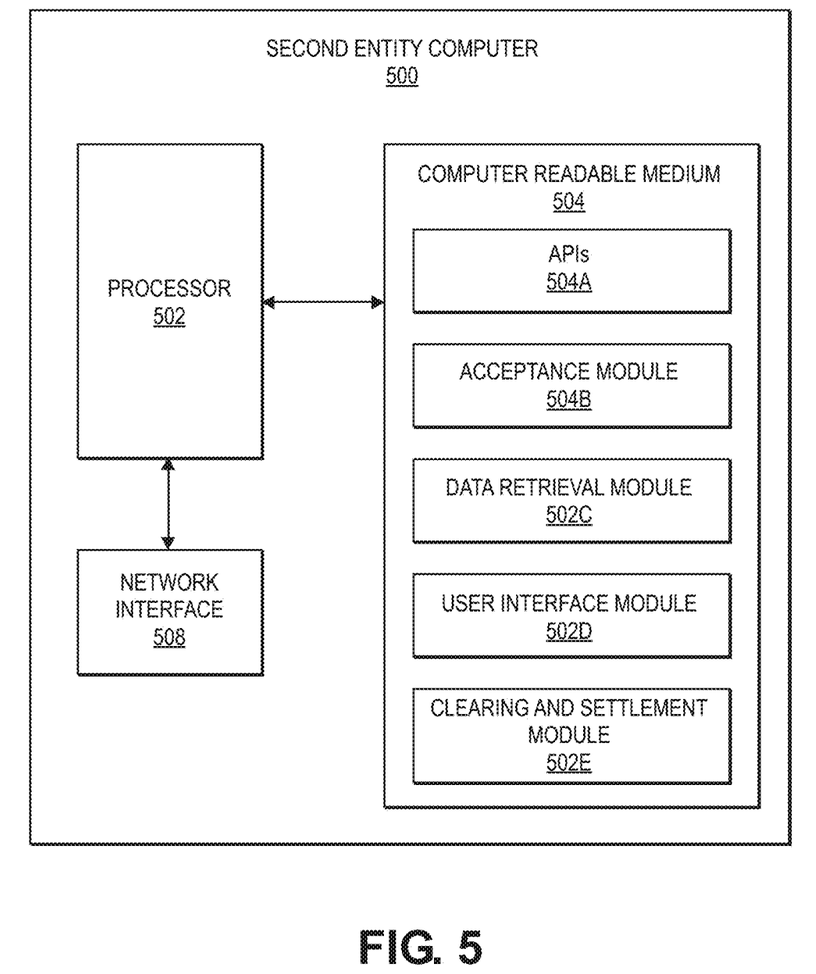
FIG. 5 shows a block diagram of a second entity computer according to an embodiment.

FIG. 5 shows a block diagram of a second entity computer 500 according to an embodiment. The second entity computer 500 can comprise a processor 502, a computer readable medium 504, and a network interface 508. Aspects of the processor 502 and the network interface 508 are similar to those described above with respect to FIG. 3, and the descriptions thereof need not be repeated herein.

The computer readable medium 504 comprises one or more APIs 504A, an acceptance module 504B, a data retrieval module 504C, a user interface module 504D, and a clearing and settlement module 502E. The computer readable medium 504 may also comprise code, which executed by the processor 502, can cause the second entity computer 500 to perform a method comprising: receiving, by the second entity computer associated with a second user from a first entity computer associated with a first user, a push transaction message comprising a value and link data for a transaction; transmitting, by the second entity computer to a directory computer in communication with a database storing supplemental data associated with the transaction and other transactions, a request for the supplemental data associated with the transaction, the request comprising link data; receiving, by the second entity computer, the supplemental data from the directory computer; and providing, by the second entity computer to the second user via a second user device, the supplemental data and a notification of an action caused by the push transaction message.

The acceptance module 504B may comprise code executable by the processor 502 for causing the second entity computer 500 to accept transactions, and credit accounts associated with push transaction messages. The acceptance module 504B and the processor 502 can analyze an authorization request message and check a transaction request message to determine if the transaction is potentially fraudulent.

The data retrieval module 502C and the processor 502 can retrieve data from a database. The date retrieved may be supplemental data or transaction data for push transactions.

The user interface module 502D and the processor 502 can provide a user interface to any client computer including the second user device 20.

The clearing and settlement module 502E and the processor 502 can perform a clearing and settlement process with various entities including a processing computer in a payment processing network.

Embodiments of the invention have a number of advantages. As noted above, in embodiments of the invention, a push transaction recipient can receive supplemental data associated with a push transaction. As a result, the push transaction recipient will know why a particular push transaction was performed. This can be done without substantially modifying existing transaction messaging formats, thereby reducing computational complexity and improving computer processing speed.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a second authorizing entity computer associated with a second user from a first authorizing entity computer associated with a first user via a processing computer, a push transaction message comprising (1) a value representing a transaction amount of a transaction and (2) link data including a hyperlink for accessing supplemental data associated with the transaction, wherein the supplemental data comprises invoice data or remittance data associated with the transaction provided by the first authorizing entity computer and uploaded to a database, wherein the push transaction message pushes the value from a first user account associated with the first user and managed by the first authorizing entity computer to a second user account associated with the second user and managed by the second authorizing entity computer without an initial request for the value from the second user;
transmitting, by the second authorizing entity computer to a directory computer in communication with the database storing the supplemental data associated with the transaction and other transactions, a request for the supplemental data associated with the transaction, the request comprising the link data, wherein the hyperlink redirects the directory computer to the supplemental data stored at the database;
receiving, by the second authorizing entity computer, the supplemental data from the directory computer; and
providing, by the second authorizing entity computer to the second user via a second user device, the supplemental data and a notification of an action caused by the push transaction message.

2. The method of claim 1, wherein the push transaction message is an original credit transaction (OCT) message.

3. The method of claim 1, wherein the action is a credit to the second user account associated with the second user.

4. The method of claim 1, wherein the link data comprises a link token.

5. The method of claim 1, wherein the second user is a resource provider that provides access to a resource to the first user.

6. The method of claim 1, wherein before receiving, by the second authorizing entity computer, the push transaction message, the supplemental data is provided to the database and the link data is provided to the first authorizing entity computer.

7. The method of claim 1, wherein the link data comprises a link token, the link token being a global unique identifier (GUID).

8. The method of claim 1, wherein the supplemental data comprises a date, a second entity identifier, and a second entity category code.

9. The method of claim 1, wherein the directory computer retrieves the supplemental data from the database by communicating with the first authorizing entity computer, which retrieves the supplemental data from the database.

10. A second authorizing entity computer comprising:
a data processor; and
a non-transitory computer readable medium, the non-transitory computer readable medium comprising code, executable by the data processor to cause the second authorizing entity computer to perform operations including:
receiving, by the second authorizing entity computer associated with a second user from a first authorizing entity computer associated with a first user via a processing computer, a push transaction message comprising (1) a value representing a transaction amount of a transaction and (2) link data including a hyperlink for accessing supplemental data associated with the transaction, wherein the supplemental data comprises invoice data or remittance data associated with the transaction provided by the first authorizing entity computer and uploaded to a database, wherein the push transaction message pushes the value from a first user account associated with the first user and managed by the first authorizing entity computer to a second user account associated with the second user and managed by the second authorizing entity computer without an initial request for the value from the second user;
transmitting, by the second authorizing entity computer to a directory computer in communication with the database storing the supplemental data associated with the transaction and other transactions, a request for the supplemental data associated with the transaction, the request comprising the link data, wherein the hyperlink redirects the directory computer to the supplemental data stored at the database;

receiving, by the second authorizing entity computer, the supplemental data from the directory computer; and providing, by the second authorizing entity computer to the second user via a second user device, the supplemental data and a notification of an action caused by the push transaction message.

11. The second authorizing entity computer of claim 10, wherein the push transaction message is an original credit transaction (OCT) message.

12. A method comprising:

receiving, by a directory computer from a second authorizing entity computer, a request for supplemental data associated with a push transaction, the request comprising a hyperlink for accessing the supplemental data associated with the push transaction, wherein the supplemental data comprises invoice data or remittance data associated with the push transaction provided by a first authorizing entity computer and uploaded to a database, wherein the first authorizing entity computer transmits a push transaction message to the second authorizing entity computer before the request for the supplemental data is received by the directory computer, wherein the push transaction message pushes a transaction amount from a first user account associated with a first user and managed by the first authorizing entity computer to a second user account associated with a second user and managed by the second authorizing entity computer without an initial request for the transaction amount from the second user;

retrieving, by the directory computer, the supplemental data from the database, wherein the hyperlink redirects the directory computer to the supplemental data stored at the database; and transmitting, by the directory computer to the second authorizing entity computer, the supplemental data.

13. The method of claim 12, further comprising:

receiving, by the directory computer from the first authorizing computer entity, the supplemental data;

uploading, by the directory computer, the supplemental data to the database before the request for the supplemental data is received by the directory computer.

* * * * *